United States Patent
Hasegawa et al.

(10) Patent No.: US 6,819,637 B1
(45) Date of Patent: Nov. 16, 2004

(54) MAGNETO-OPTICAL APPARATUS AND OPTICAL HEAD

(75) Inventors: Shin-ya Hasegawa, Kawasaki (JP); Nobuhide Aoyama, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 947 days.

(21) Appl. No.: 09/660,323

(22) Filed: Sep. 12, 2000

(30) Foreign Application Priority Data

Dec. 14, 1999 (JP) .......................................... 11-354802

(51) Int. Cl.$^7$ ............................................... G11B 7/00
(52) U.S. Cl. ............................. 369/44.23; 369/13.32; 369/44.12; 369/110.03
(58) Field of Search .......................... 369/13.11, 13.13, 369/13.29, 13.32, 112.16, 118, 44.23, 106, 44.12, 110.03, 112.1, 112.15, 110.02, 53.35, 44.14, 44.32, 112.03

(56) References Cited

U.S. PATENT DOCUMENTS

| | | | | |
|---|---|---|---|---|
| 5,539,718 A | * | 7/1996 | Hoshi et al. ................. | 369/100 |
| 5,610,897 A | * | 3/1997 | Yamamoto et al. ..... | 369/124.03 |
| 5,708,644 A | * | 1/1998 | Hasegawa ................. | 369/44.12 |
| 5,881,043 A | * | 3/1999 | Hasegawa et al. .......... | 369/106 |
| 6,243,334 B1 | * | 6/2001 | Hasegawa et al. ....... | 369/44.23 |

FOREIGN PATENT DOCUMENTS

| | | |
|---|---|---|
| JP | 684223 | 3/1994 |
| JP | 6119676 | 4/1994 |
| JP | 9231604 | 9/1997 |
| JP | 1153748 | 2/1999 |
| JP | 11126389 | 5/1999 |
| JP | 11161974 | 6/1999 |

* cited by examiner

*Primary Examiner*—Ali Neyzari
(74) *Attorney, Agent, or Firm*—Greer, Burns & Crain, Ltd.

(57) ABSTRACT

A magneto-optical disk drive that prevents the track shift signal from overlapping the MO signal, even when the optical head projects a divergent spherical wave onto the beam splitter. This objective is realized by a magneto-optical disk drive that uses an optical head which emits a divergent spherical wave onto a beam splitter surface of a beam splitter. Since the tracking error signal, which is overlapped by the MO signal of the MO detection unit, is synchronous with the tracking signal, a correction circuit is used to overlap the MO signal with the tracking error signal and to eliminate errors caused when the track shift signal overlaps the MO signal.

9 Claims, 14 Drawing Sheets

MAGNETO-OPTICAL APPARATUS AND OPTICAL HEAD

Generally, the present invention relates to a magneto-optical apparatus and an optical head that uses a magneto-optical storage medium to which data is written to and/or read from by applying a laser beam and a magnetic field thereto. More particularly, the present invention relates to a magneto-optical apparatus and an optical head that irradiates a beam splitter with the divergent spherical light of a laser beam.

BACKGROUND OF THE INVENTION

Optical disks have been widely used as external storage mediums for computers. Within the multi-layered structure of an optical disk, and particularly within the structure of a magneto-optical disk, a magnetic recording layer is provided. Since data is written perpendicularly on the magnetic recording layer, the ability to save the recorded contents is good, making it possible to repeatedly read and write new data many times. In a magneto-optical disk, a sub-micron order mark can be written onto the medium by using a laser beam. When compared with floppy disks, magneto-optical disks have much greater storage capacities, and such capacities are being improved even further. For example, when considering a 3.5-inch magneto-optical (MO) disk, it is now possible to store up to 1.35 GB thereon, whereas earlier MO disks had storage capacities of approximately 128 MB. While high storage capacity is important, it is desirable that the magneto-optical disk apparatus used for reading the MO disk is also compact, lightweight, and of a low cost.

FIG. 13 and FIG. 14 are explanatory drawings of prior art devices. FIG. 13 shows a prior art magneto-optical read/write head, and FIG. 14 is a top view of the polarization distribution surface of FIG. 13.

In FIG. 13, the magneto-optical disk medium 96 includes a recording layer that is formed on the top of a substrate, and is made from a magnetic material. This medium 96 makes use of the changes in the heat of the light from a laser and a magnetic field in order to allow information to be written thereon. There are data tracks on this medium for reading and writing the data. Generally, a spiral shaped groove (a tracking groove) is formed on the medium 96. The tracks for reading and writing data are formed on the lands between the grooves.

The light beam of an optical head 90 tracks the spiral track. When writing information, the head 90 makes use of the magnetic field and the changes in the heat of the light in order to write the information. Moreover, when reading the information, the head 90 makes use of the magneto-optical effect to read the information from the light beam reflected back from the disk medium. In order to read or write, the laser beam is focused on the writing surface of the medium. Focus servo control is performed such that the laser beam is maintained in the focused state. In addition, it is also necessary for the light beam to follow the data track. Therefore, track servo control is also used.

In this optical head 90, after the light emitted from the semiconductor laser 91 passes through a beam splitter 93, the light is arranged to become a parallel beam by a collimator lens 94, and then it is focused on the magneto-optical disk 96 by an objective lens 95. On the magneto-optical (MO) disk 96, in the area of the mark, the polarization angle of the light is turned by the Kerr effect. For example, by using the P-polarized light component for detection, the polarization angle is rotated only at the mark area by $\theta K$ by the Kerr effect in order to generate the S-polarized light component.

The reflected light intensity of the S-component and that of the P-component are changed by the beam splitter surface 93a, which is part of the polarization beam splitter 93. Then, the light is separated into the S and P components by another beam splitter (not shown in the figure), such as a Wollaston prism, and then it is input to the light detection devices. The read signal (called the MO signal) is detected from the difference between the strengths of the two signals.

Part of the light returning from the MO disk 96 is projected onto the beam splitter 93, at which time the focus error signals and the track error signals are detected. In this way, in order to read the signal from the polarized component of the light returned from the MO disk, a polarization separation function is required. When this arrangement of a magneto-optical head is compared with the head for an optical disk, the construction of this arrangement is much more complicated.

In order to simplify the construction of this type of magneto-optical head, the following construction has been proposed in the prior art. Briefly, the divergent spherical wave of a semiconductor laser 91 is projected onto beam splitter surface 93a of a beam splitter 93 (for example, as disclosed in Japanese Patent Application H9-231604). In this proposal, the magneto-optical disk signal detection and the servo detection functions are integrated, making it possible to reduce the number of optical components within the optical head. In addition, it is also possible to reduce the number of places requiring adjustment, as well as to make the optical head more compact and of a lower cost.

However, this prior art configuration has the following problems. In order to project the divergent spherical wave of the semiconductor laser 91 onto the beam splitter surface 93a of the beam splitter 93, the beam is projected onto the beam splitter surface 93a with an inclination. Therefore, as shown in FIG. 13 and FIG. 14, the S-polarized light component is generated by the beam splitter 93. As a result, after the beam has passed the beam splitter 93, the linear polarization component of the light emitted from the collimator lens 94 is slightly rotated.

For signals such as the MO signal, which are detected by determining the difference between the S-polarized light component and the P-polarized light component, it is not possible to eliminate this rotation effect. In other words, as shown in FIG. 14, this rotated component overlaps the bowl-shaped image B of the diffracted light from the groove, so the MO signal component is overlapped when tracking shifts. The tracking shift is not constant, so the amount of overlap changes corresponding to the tracking shift, and MO errors occur. When this happens, it becomes difficult to reproduce the MO signal.

SUMMARY OF THE INVENTION

The objective of the present invention is to provide an improved magneto-optical apparatus and an optical head for accurately reproducing and/or reading an MO signal even when the apparatus is made more compact.

A second objective is to provide an improved magneto-optical apparatus and an optical head for accurately reproducing and/or reading an MO signal of a relatively simple design.

Another objective of the present invention is to provide a magneto-optical apparatus and an optical head for accurately reproducing an MO signal even when the apparatus is made more compact, and where the apparatus includes structure for projecting the spherical divergent beam of a semiconductor laser onto the beam splitter surface of a beam splitter.

A further objective of the present invention is to provide a magneto-optical apparatus and an optical head of a configuration that eliminates the signal component that is overlapped with the MO signal when track shifting occurs.

Briefly, the magneto-optical apparatus of the present invention includes a beam splitter that has a beam splitter surface for splitting the path of a light beam into a forward path, which is directed toward a magneto-optical storage medium, and a return path that leads from the medium; a light source for emitting a divergent spherical wave onto the beam splitter surface of the beam splitter in order to emit a spot of light onto the magneto-optical storage medium; an MO detection unit for detecting a magneto-optical signal from a light beam on the return path from the beam splitter surface of the beam splitter; a track error detection unit for detecting a tracking error signal from the light of the return path; and a correction unit for correcting the MO signal by overlapping the tracking error signal with the MO signal.

In this invention, an MO signal, which is overlapped by the tracking error signal, is found that is synchronous with the tracking error signal. By overlapping the tracking error signal with the MO signal, the overlapped error is removed. By doing this, it is possible to easily reproduce the MO signal, even when using a compact optical head as long as that head emits a divergent spherical wave onto the beam splitter surface of a beam splitter. More particularly, it is possible to accurately reproduce the MO signal even when the P-polarized light component and the S-polarized light component are difficult to separate due to increased density.

In another embodiment of the magneto-optical apparatus of this invention, the beam splitter surface of the beam splitter is curved in one direction. Therefore, it is possible to reduce its dependence on the angle of incidence of the laser beam, thereby preventing a reduction of the amount of light. In addition, the reproduction of the MO signal becomes more accurate.

In yet another embodiment of the magneto-optical apparatus of this invention, the beam splitter surface of the beam splitter passes through the divergent spherical wave and is projected along the forward light path with P-polarization. In this other embodiment of the magneto-optical apparatus of this invention, the beam splitter surface of the beam splitter reflects the divergent spherical wave, and is projected along the forward light path with S-polarization.

The optical head of the present invention includes a beam splitter that has a beam splitter surface for splitting the path of the light beam traveling both to and from a magneto-optical storage medium, a light source for emitting a divergent spherical wave onto the beam splitter surface of the beam splitter that emits a spot of light onto the magneto-optical storage medium, an MO detection unit for detecting the magneto-optical signal from a light beam on the return path from the beam splitter surface of the beam splitter, and a ½ λ wavelength plate that is located between the magneto-optical storage medium and the beam splitter, and where the direction of linear polarization of the light emitted from the beam splitter with respect to the magneto-optical storage medium is set such that it is orthogonal to a groove of the magneto-optical storage medium.

In this embodiment of the present invention, in order to obtain the tracking signal in the return light path, the direction of linear polarization is set to be orthogonal to the groove so that the bowl-shaped image does not overlap with the rotated component of polarization, which makes it is possible to prevent the MO signal component from being overlapped by the tracking error signal. In addition, it can be realized by the construction of the present optical head.

BRIEF DESCRIPTION OF THE DRAWINGS

Preferred embodiments of the present invention are described herein with reference to the drawings wherein.

DESCRIPTION OF THE PREFERRED EMBODIMENTS

The main features of the present invention will be explained in the following order: first the magneto-optical apparatus will be discussed generally, next a first embodiment of the optical head will be discussed, then a second embodiment of the optical head, and finally a third embodiment of the optical head will be discussed.

Figure 1:
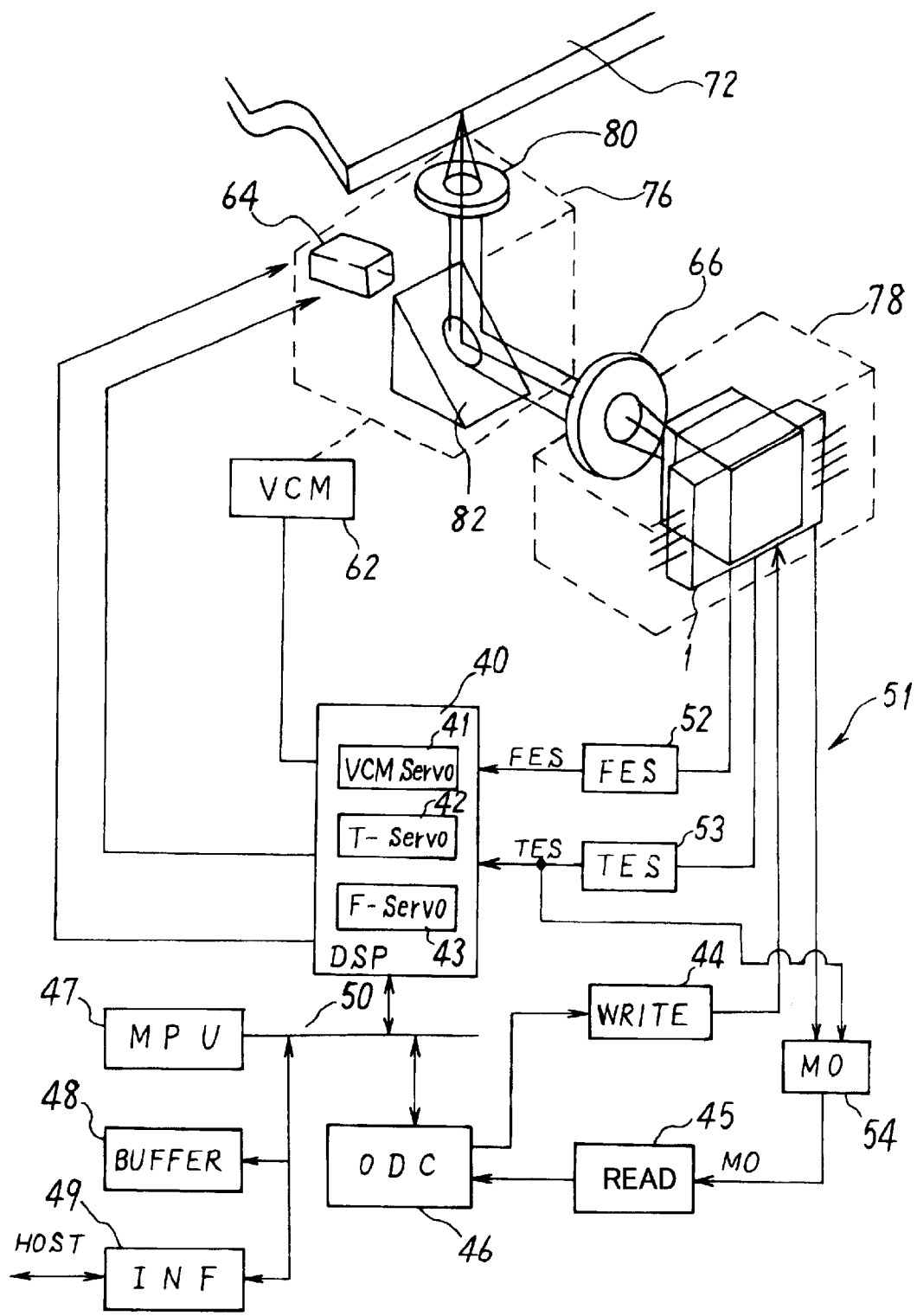
FIG. 1 is a schematic diagram of the magneto-optical disk drive of one embodiment of the present invention.
Figure 2:
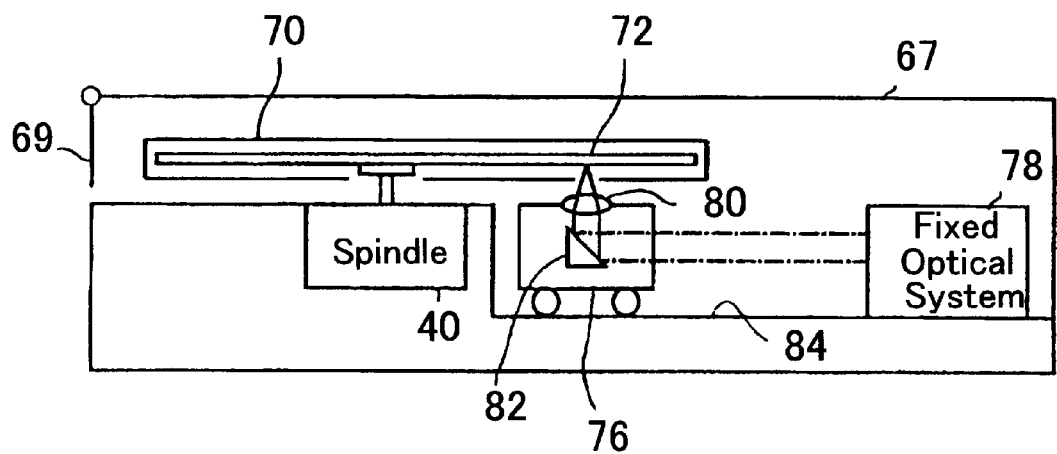
FIG. 2 is a profile view of the drive shown in FIG. 1.

FIG. 1 is a schematic diagram of the magneto-optical disk drive of a preferred embodiment of the present invention, and FIG. 2 is a plan view of the drive shown in FIG. 1.

As shown in FIG. 2, a magneto-optical disk 72 is provided on the inside of a magneto-optical cartridge 70. The magneto-optical cartridge 70 is inserted into the drive through an inlet door 69 which is located on the drive 67. A spindle motor 40 is used to rotate the magneto-optical disk 72. The present invention also includes an optical head, which is divided into a movable unit 76 and a stationary unit 78. The movable unit 76 is moved along a rail 84 by a VCM 62 (see FIG. 1).

As shown in FIGS. 1 and 2, the movable unit 76 includes an objective lens 80, a mirror 82, and a focus/track actuator 64 that moves the objective lens 80 in both the focus direction and the track direction. The stationary unit 78 includes a collimator lens 66 and an incorporated head 1. The incorporated head 1 will be described in more detail later while discussing FIG. 3.

As can be seen in FIG. 1, the optical head also includes a control circuit 51, which is constructed as follows. An interface 49 exchanges commands and data with the host. A buffer 48 temporarily stores write data and read data. A MPU (microprocessor) 47 performs overall control of the magneto-optical disk drive. An ODC (optical disk controller) 46 includes a sync-byte detection circuit, a demodulation circuit, a CRC check/ECC correction circuit, a sector address detect unit and a data buffer. A bus 50 is used to connect the components of the control circuit together.

Also included as part of the control circuit 51 is a write LSI circuit 44, which includes a write modulator and a laser diode control circuit. The write modulator modulates the write data from the ODC 46 to a particular data format, such as the pit position modulation (PPM) write data format (also referred to as the mark writing data format) or the pulse-width modulation (PWM) write data format. The data format selected depends upon the type of magneto-optical disk that is being utilized. This modulated data is used by the laser diode control circuit to control the intensity of the laser beam that is emitted from the optical head 1.

The read LSI circuit 45 of the control circuit 51 includes a read demodulator and a frequency synthesizer. The read demodulator includes an AGC (auto gain control) circuit, a filter, a sector mark (sector ID) detection circuit, and an analog/digital conversion circuit (ADC). The frequency synthesizer generates a read clock that is synchronized to the VFO signal in the sector. The read demodulator detects the sector mark from the ID signal or the MO signal that has been input from the optical head 1, and outputs a detection signal SM to the ODC 46. In addition, the read demodulator converts the MO signal that has been input from the optical head 1 to a digital value, and outputs it to the ODC 46.

The optical head 1 detects light returning from the magneto-optical disk 72, as more fully described below. A MO detection unit 54 reproduces the MO signal from the returning light beam. Also as described below, the track error signal TES is also input into this MO detection unit 54 so that tracking the MO signal can be corrected.

The servo control circuit portion of the control circuit 51 includes a TES detection circuit 53 that creates a TES (track error) signal from the light beam returning from the optical head 1, an FES detection circuit 52 that creates an FES (focus error) signal from the light beam returning from the optical head 1 and a DSP (digital signal processor) 40.

The DSP 40 drives the track actuator 64 of the optical head by a track servo loop 42, and controls the track servo. In addition, the DSP 40 drives the focus actuator 64 of the optical head by a focus servo loop 43, and controls the focus servo. This DSP 40 performs drive control of the VCM 62 that moves the movable unit 76 across the horizontal direction of the track of the magneto-optical disk 72. Also, the coil for the bias magnetic field (not shown in the figure) is controlled by the DSP 40.

Figure 3:
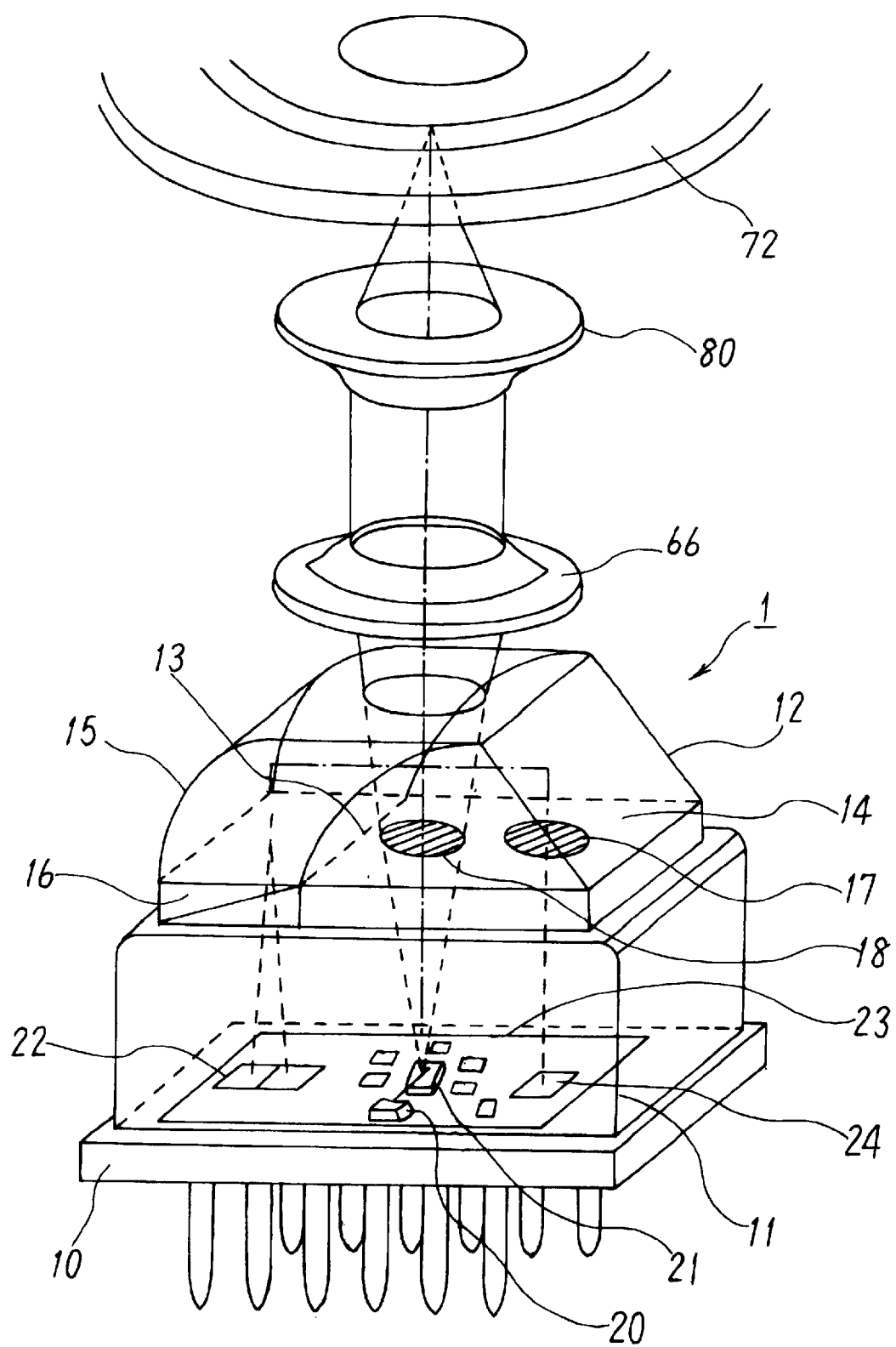
FIG. 3 is a pictorial view of the optical head shown in FIG. 1.
Figure 4:
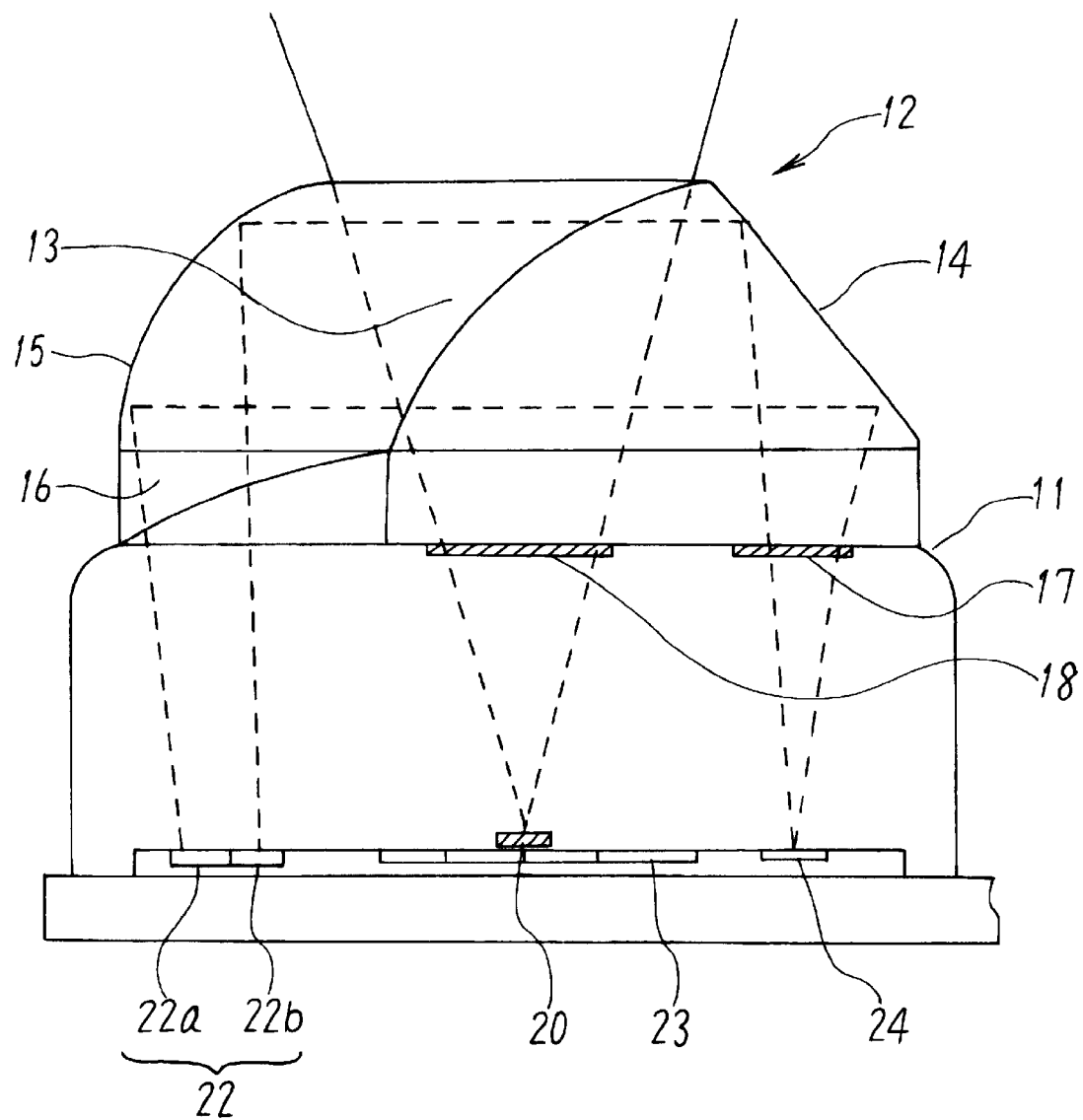
FIG. 4 is a front view of the optical head shown in FIG. 3.
Figure 5:
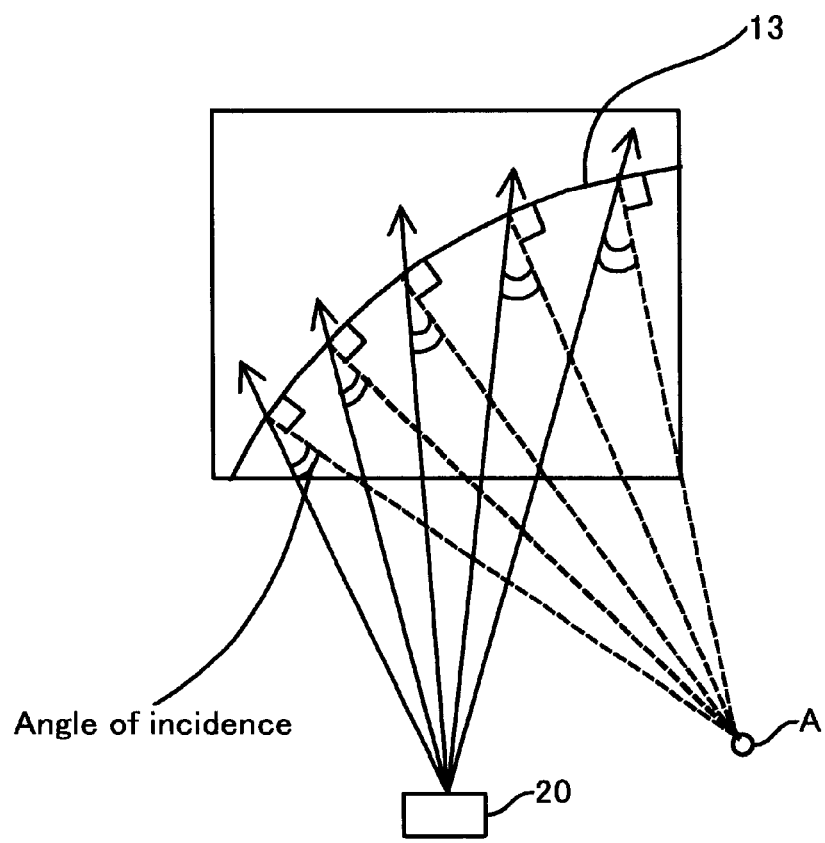
FIG. 5 is a drawing explaining the beam splitter surface of the optical head shown in FIG. 3.

FIG. 3 is a more detailed pictorial view of the optical head in FIG. 1, FIG. 4 is a front view of the optical head, and FIG. 5 is a drawing explaining the beam splitter surface of the optical head.

As can be seen in FIGS. 3 and 4, a semiconductor laser element 20 is located on a substrate 10. A mirror 21 is used to change the direction of the laser beam emitted from the semiconductor laser element 20 so that it is directed towards a optical element 12. A pair of MO sensors (light detectors) 22 are located on the substrate 10.

This pair of MO sensors 22 includes a P-polarized light component detector 22a and an S-polarized light component detector 22b (both shown in FIG. 4). In addition, there is also an APC (auto power control) detector 24 on the substrate 10. The APC 24 is used for monitoring the intensity of the light beam emitted from the semiconductor laser element 20.

Furthermore, the optical head also includes a track and focus error detector 23 on the substrate 10, which will be described later using FIG. 10. A case 11 is formed around the substrate 10, and the optical element 12 is located on the top of the case 11. The optical element 12 includes a cylindrical surface 13 around which the thin film of a beam splitter is formed, and this cylindrical surface 13 is used for switching between the forward light path and the return light path. The optical element 12 also includes a reflective surface 14 for guiding the reflected light on the forward light path from the cylindrical surface 13 of the beam splitter to the APC light detector 24, and a diffraction grating (hologram) 17 that focuses the light from the reflective surface 14 onto the APC light detector 24.

Additionally, the optical element 12 also includes a second reflective surface 15 that has a cylindrical surface of its own for guiding the reflected light on the return light path from the cylindrical surface 13 of the beam splitter to the MO sensors 22. A double refracting optical element 16 for separating the light reflected from the reflective surface 15 into a P-polarized light component and an S-polarized light component is incorporated into the optical element 12. There is also a hologram 18 (described later using FIG. 10) for performing the tracking and focus detection functions of the optical element 12.

In the optical head 1 of this construction, the divergent spherical wave from the semiconductor laser element 20 is made to proceed towards the optical element 12 upon being reflected by the mirror 21. This light beam passes through the cylindrical surface 13, which is the beam splitter surface, by way of the hologram 18, and is projected onto the collimator lens 66. The light is then converted to a parallel light beam by the collimator lens 66, and is then focused onto the magneto-optical disk 72 by way of the objective lens 80.

On the forward path of this light, the light reflected from the cylindrical surface 13 (which is the beam splitter surface) is projected onto the APC light detector 24 after being reflected downwardly by the reflective surface 14. In this way, the intensity of the emitted light is monitored, and the light intensity of the light from the semiconductor laser is automatically controlled by the laser control circuit of the write circuit 44 (shown in FIG. 1).

On the return path of this light, part of the light reflected from the magneto-optical disk 72 is first reflected by the cylindrical surface 13 (which is the beam splitter surface), and this part of the light is projected onto the MO detectors 22a, 22b by way of the second reflective surface 15 (which is also a cylindrical surface) and the double refracting optical element 16. The P-polarized light component and the S-polarized light component are separated by the double refracting optical element 16, and by taking the difference (push-pull) between the outputs of the detectors 22a, 22b, the MO signal is detected.

On this same return path, the part of the light not reflected by the cylindrical surface 13 passes through the cylindrical beam splitter surface 13, and is projected onto the track/focus detector 23 by way of the hologram 18 (this construction of the track/focus detector 23 and its operation are described in more detail later using FIG. 10). In this way, it is possible to detect the track error signal and the focus error signal by using the push-pull method.

Next, the cylindrical surface 13 of the beam splitter will be described in detail, as this is an important feature of the present invention. Conventionally, the thin film of the beam splitter that switches between the forward path and the return path was formed on a flat inclined surface. By placing the thin film of the beam splitter between the semiconductor laser and the condensing lens, there is a high dependence on the angle of incidence, and when the angle shifts 10 degrees from the design angle of incidence (which can be, for example, 45 degrees), a drop in the intensity of the surrounding light flux and the amount of light accompanying it occurs. In addition, the diameter of the focused beam increases, as well as resulting in an increase in the phase difference between the P-waves and the S-waves of linear polarization. Thus, the CN ratio of the return path becomes poor.

In order to reduce this dependence on the angle of incidence, it is necessary to reduce the size of the opening (such as a reduction to, for example, NA 0.05). By doing so, the amount of light greatly drops, and thus high-speed writing to a large-capacity optical disk is difficult.

To solve this problem, the present invention features an optical system that does not depend on the angle of incidence. In other words, the thin film of the beam splitter of the present invention is an optical element formed on a curved surface. In FIG. 5, point A is the center of the circle which is a cylindrical surface 13, and so the each normal line on the cylindrical surface 13 is pointed toward the point A. The incident angle is defined as the angle between the incident beam on the surface 13 and the normal line to the surface 13. So, by optimizing the circular curvature of the surface 13, the each incident angle is almost the same. Therefore, there is little dependence on the angle of incidence.

Generally, a magneto-optical disk is designed such that the rate of transmission of the P-polarized light towards the disk medium is 80%, and 100% of the S-polarized light is reflected and returned as a magneto-optical signal. In the design of a beam splitter film whose center is 45 degrees, there is hardly any drop in the amount of light or any increase in the phase difference within a tolerance of ±3 degrees. From this it is possible to obtain favorable optical characteristics.

In the cylindrical surface 13 of the present invention, the polarization direction of the semiconductor laser is the direction with curvature (which is used as the beam splitter that allows P-polarized light to pass) and the orthogonal direction is the surface without curvature.

The reason that a cylindrical surface is used, instead of a spherical surface, is because of its simplicity of manufacturing. After the film has been deposited on a relatively long cylinder, it is possible to manufacture several cylindrical beam splitters at a low cost by simply cutting the long cylinder into a plurality of shorter cylinders. The parallel direction is linear, and since it is not necessary to adjust the position of the optical element, the beam splitter can be processed and installed easily, as well as be manufactured at a low cost.

Moreover, since a cylinder shape is used, it is assumed that shifts in the angle will occur. However, according to this optimum design, the shift in deviation angle will be within 0.5 degrees, at most, and the Numerical Aperture (NA) opening of the collimator lens can be 0.2, even in the parallel direction. So it is possible to obtain plenty of light, even when writing to a optical disk at high speed, and there have been no problems encountered in the actual application of this feature.

The P and S-polarized light components of the magneto-optical signal from the return path are reflected by a thin film on the cylindrical surface 13 of the beam splitter that switches the path between the forward path and the return path. This reflected light is converged by the second reflecting surface 15, which is formed as a cylindrical surface that is nearly identical the cylindrical surface 13, and then the light is projected onto the double refracting optical element 16, whose optic axis is rotated 45 degrees from the vertical plane of the light beam. In doing this, the light is separated into two beams that are projected onto the two detectors 22a, 22b. Therefore, by detecting the difference (push-pull), the magneto-optical signal (MO signal) is detected. It is possible to focus the beam according to the parameters of the cylindrical surface 13 and the second reflective surface 15 (which is also cylindrical-shaped).

In other words, the second reflective surface 15 performs both the role of reflecting the light and the role of focusing the light. In this way it is possible to do without the use of a separate focusing member. Moreover, holograms 17, 18 are used so that it is possible to construct an integrated head. By eliminating extraneous optical components in this manner, it is possible to provide an inexpensive head, as well as to reduce the amount of adjustment because fewer adjustable components are being utilized. Furthermore, since the head is integrated into a single unit, the optical head is both lightweight and compact.

Figure 6:
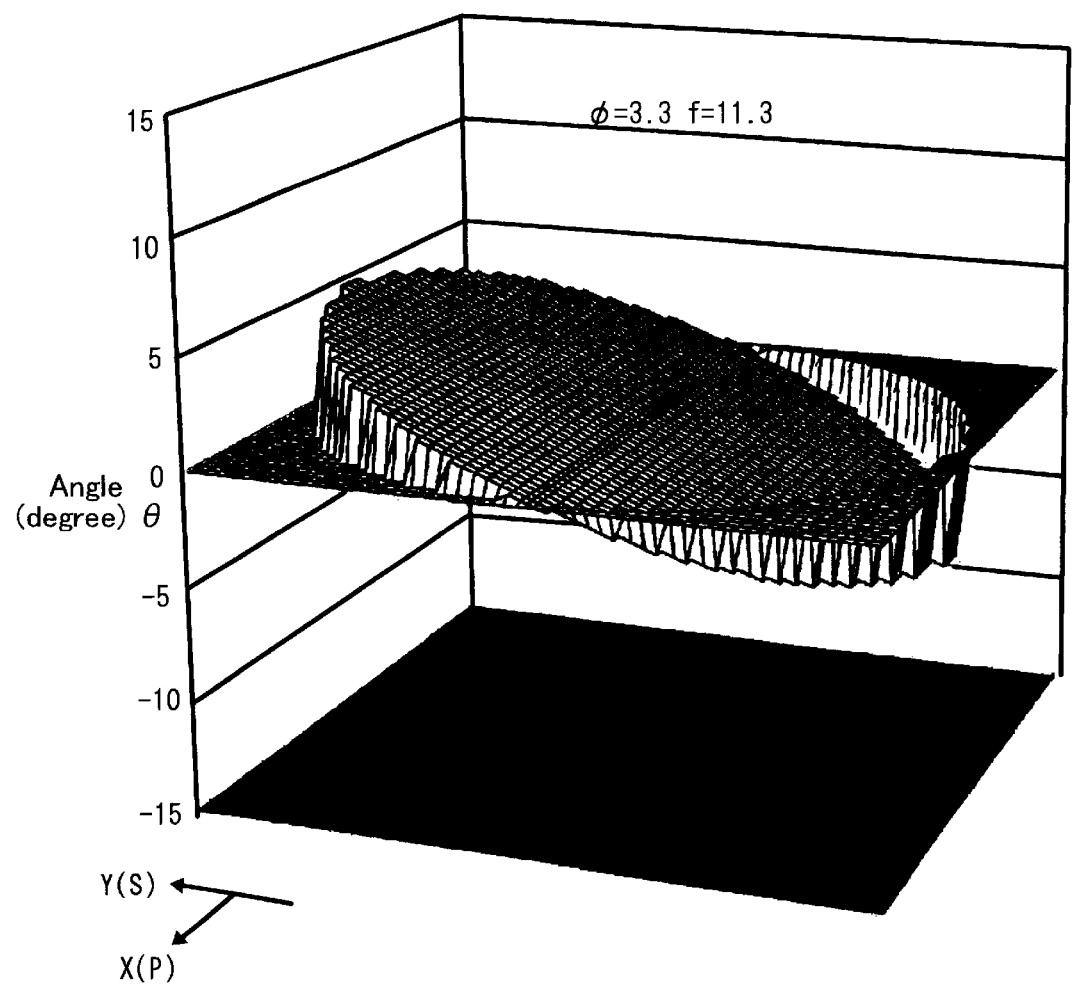
FIG. 6 is drawing explaining the polarized direction angle rotation by the beam splitter surface of the optical head in FIG. 5.
Figure 7:
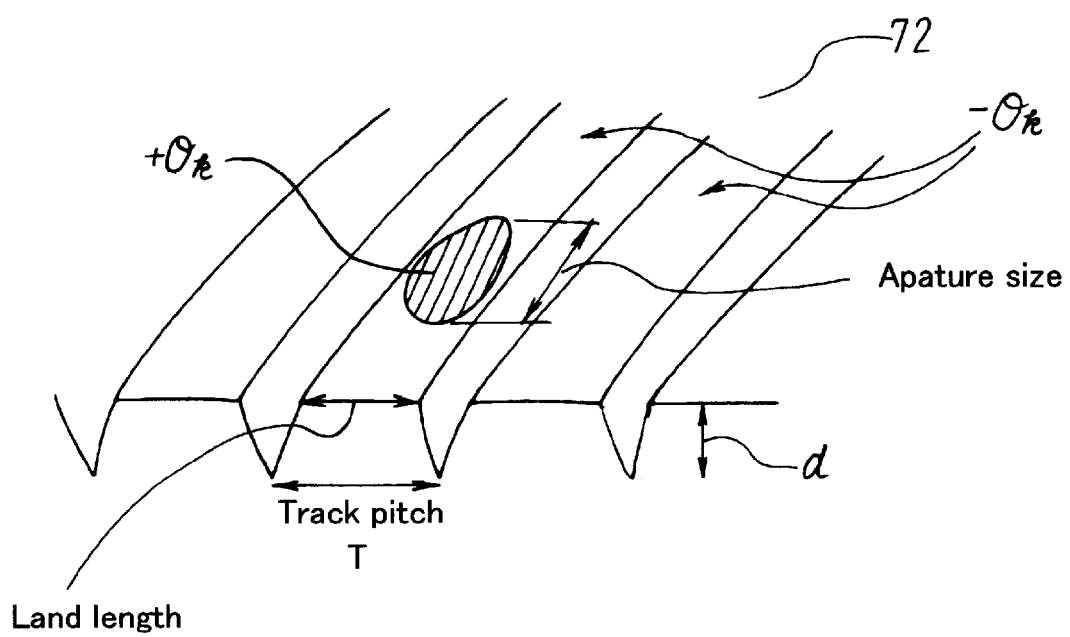
FIG. 7 is a drawing explaining the MO signal of one embodiment of the present invention.
Figure 8:
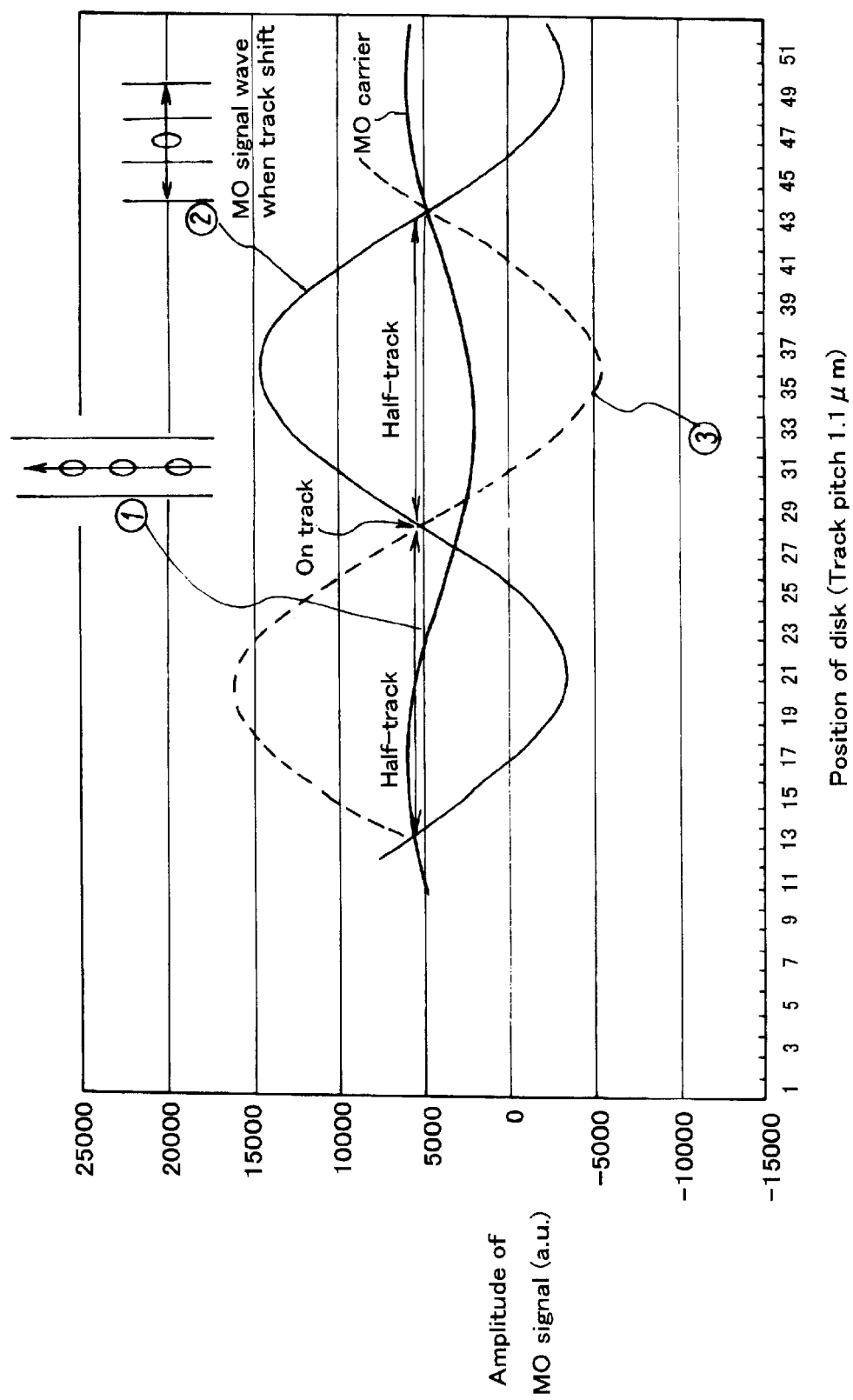
FIG. 8 is a drawing showing the relationship between the MO signal and the TES signal of one embodiment of the present invention.
Figure 9:
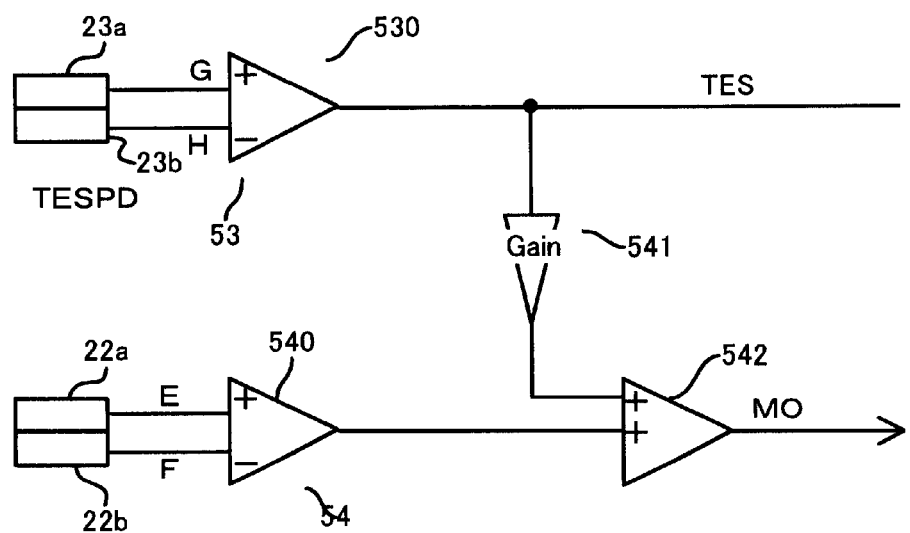
FIG. 9 is a schematic diagram of the correction circuit of FIG. 1.

Next, the effect on the MO signal when using a divergent spherical wave will be explained. FIG. 6 explains the polarized direction angle rotation by the beam splitter surface, FIG. 7 shows an example of an MO signal on a magneto-optical disk, FIG. 8 shows the relationship between the MO signal and the TES signal, and FIG. 9 is a circuit diagram of a preferred embodiment of the correction circuit.

The divergent spherical wave from the semiconductor laser 20 is projected onto the cylindrical surface 13 of the beam splitter. Thus, an inclined beam (P-polarized light) is projected in the case of the flat surface of the prior art, as well as in the case of the cylindrical surface of the present invention described above. Therefore, as shown in FIG. 6, the S-polarized light component is generated by the beam splitter. As a result, after the light passes through the beam splitter, the linear polarized direction of the light from the collimator lens 66 is rotated a slight amount.

When detecting the difference between the S-polarized light component and the P-polarized light component as in the case of the MO signal, track error effects occur. This will be explained while referring to FIG. 7. When light is projected onto the magneto-optical medium 72, the Kerr rotation angle of the magneto-optical signal (MO signal) is taken to be θk, and the strength of the electric field is taken to be Ex. The Kerr rotation angle of the magnetic orientation (upward) when the magneto-optical signal is written is taken to be +θk, and the Kerr rotation angle of the magnetic orientation (downward) when the magneto-optical signal is not written is taken to be −θk. In this case, the electric field on the magneto-optical disk medium 72 is expressed by the following equation:

$$E = \tfrac{1}{2} \cdot E \cdot \exp[i(\omega t + \phi + \theta k)] + \tfrac{1}{2} \cdot E \cdot \exp[i(\omega t + \phi - \theta k)]$$

In other words, the magnetic field is expressed in equation (1) above as the sum of the right and left circular polarizations. Also, by setting the phase of the medium 72 at the place where the reading laser beam shines on it to be d, the electric field at that place is determined by replacing in equation (1) with d.

The electric field distribution when the light reflected by the disk 72 is projected again by the objective lens 80 can be obtained by taking the Fourier transform of equation (1). Then, the linear polarized light is projected onto the cylindrical surface 13 of the beam splitter, and is rotated in the horizontal direction (which is the direction that the cylindrical surface 13 is not curved) according to the reflectivity of the cylindrical surface 13.

When the angle of rotation of the polarized light, when projected at an angle onto the cylindrical surface 13, is taken to be b, and the reflectivity of the S-polarized light and P-polarized light are taken to be Rs and Rp, respectively, then the angle η of rotation of the polarization surface can be expressed by the following equation:

$$\eta = \eta b \cdot SQR(Rs)/SQR(Rp) \quad (2)$$

In other words, rotation is amplified by the polarization surface. By adding the reflectivity Rs of the S-polarized light and the reflectivity Rp of the P-polarized light, as reflected by the cylindrical surface 13, as well as the angle of rotation 'η' of polarization found in equation (2), to the electric field found in equation (1), and by taking the Fourier transform, the electric field where the light is focused on the light detectors 22a, 22b is obtained. From equations (1) and (2), it is also possible to calculate the amplitude of the MO signal.

In FIG. 7, an example of a 640 MB medium is shown where the track pitch T is 1.1 μm, the length of the land is 0.7 μm, the depth d of the groove is λ/2 (λ=685 nm), the objective lens is NA=0.55, the focal length (f) of the collimator lens is 11 mm, and the aperture size is 0.64 μm. As known in the art, the track error signal can be calculated using the track pitch (T) and the depth of the groove (d).

FIG. 8 shows the relationship between the MO signal and the TES signal. The electric field when the light beam is on the track and read, or in other words, the carrier of the MO signal, is indicated by '①'. Next, the MO signal when the light beam is moved in the direction orthogonal to the track direction is indicated by '②'. The track error signal TES is indicated by '③'.

As can be seen from curves ① and ② (in FIG. 8, when tracking shifts, the amplitude of the MO signal increases up to 8 times. The tracking signal TES is obtained from the vertical difference on the polarization surface in FIG. 14, and the size of the bowl-shaped image B changes according to the amount of track shift. The distribution of the polarization component rotated by this polarization surface overlaps with the light/dark pattern of the bowl-shape of the track shift, so it can be seen that the MO signal fluctuates according to the amount of track shift.

FIG. 8 also shows that the amount of track shift, which is shown in curve ②, cannot be removed by detecting the magneto-optical signal differential. Because the amplitude of the MO signal fluctuates from even a slight track shift, it is not always possible to accurately reproduce data. As shown by curve ③ in FIG. 8, the waveform of curve ② is in the same phase with the TES signal of curve ③. Therefore, curve ③ can be used for removing the track shift.

FIG. 9 is a preferred embodiment of a correction circuit used for the purpose of removing the track shift, and includes a detailed drawing of both the TES detection circuit 53 and the MO detection circuit 54 in FIG. 1. Referring back to FIG. 9, the MO signal I (of equation (3) below) is obtained by determining the difference between the outputs E, F of the MO detectors 22a, 22b from the differential amp 540. On the other hand, the TES signal is obtained by determining the difference between the outputs G, H of the TES detectors 23a, 23b from the differential amp 530. A gain multiplier 541 multiplies the detected TES signal by a specified gain K. A summing amp 542 adds the output of the differential amp 540 and the output of the gain multiplier 541, and outputs a corrected MO signal. Accordingly, the MO signal I is obtained from equation (3) below:

$$I = (E-F) + K(G-H) \quad (3)$$

Here, the gain K is the specified gain for eliminating the offset of the MO signal. Desirably, K is a fixed value. With this configuration it is possible to remove the error component that is due to the track error from the differential MO signal.

Figure 10:
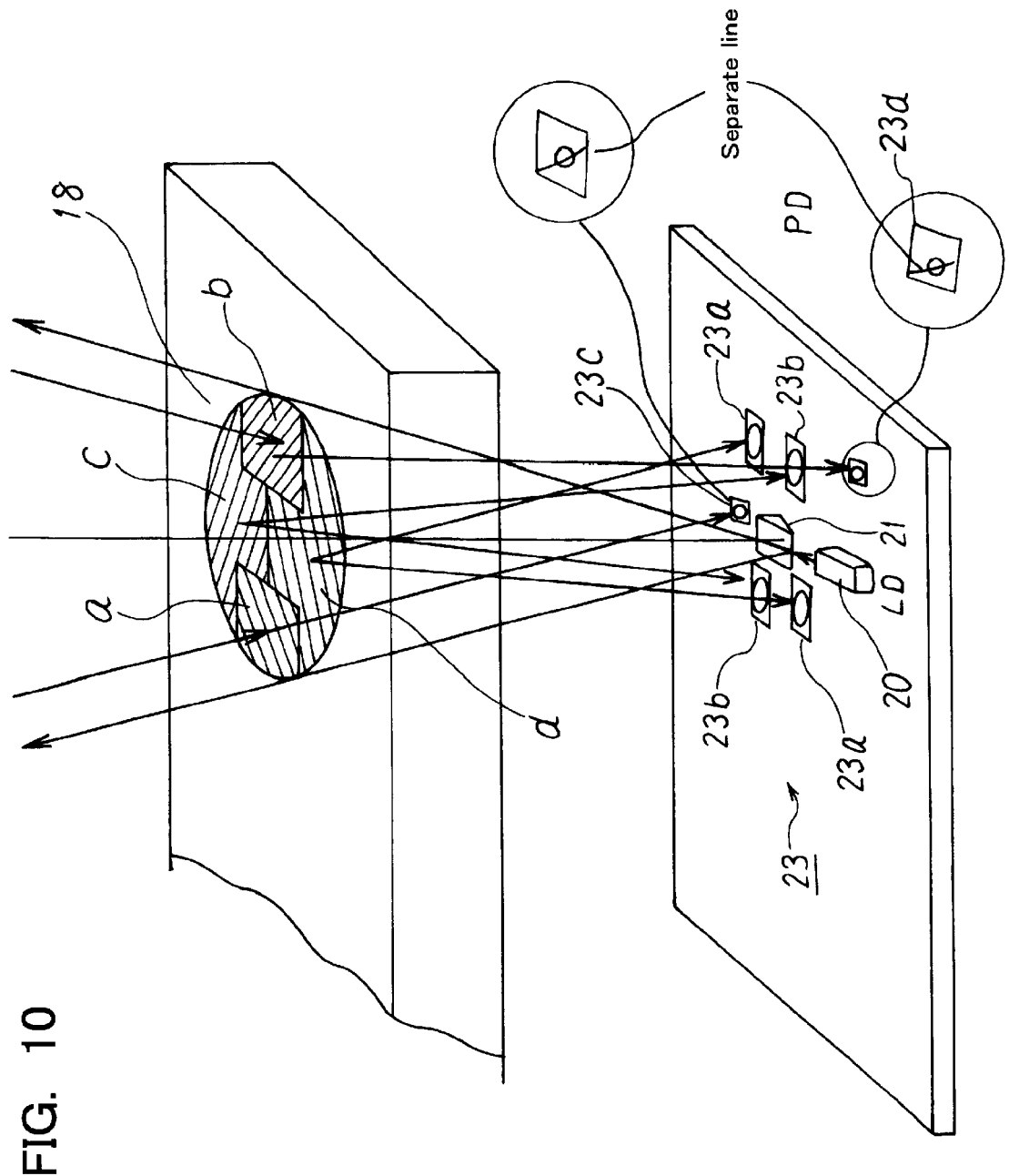
FIG. 10 is a drawing explaining the track and focus detection device.

Next, FIG. 10 will be used to explain about the track and focus detection mechanism of the preferred embodiment of the optical head. In FIG. 10, a hologram 18 includes focus servo holograms (diffraction gratings) a, b, and track servo holograms (diffraction gratings) c, d. The size of the diffraction gratings is determined according to the light distribution required for the disk system. The diffracted light from the diffraction gratings c, d is projected onto the track servo detectors 23a, 23b, and, as described above while referring to FIG. 9, it is possible to detect the track error signal by the push-pull method. The detectors 23a, 23b are configured in sets of two of each type of detector (i.e., there are two detectors labeled as 23a and two detectors labeled as 23b) in order to detect both the negative (−) primary light and the positive (+) primary light.

The diffracted light from diffraction gratings a, b is projected onto the two separate focus servo detectors 23c, 23d, and, as described above while referring to FIG. 10, it is possible to detect the focus error signal FES.

As described above, in an optical head which includes rotation of the linear polarized light by using a flat beam splitter surface for projecting a divergent spherical wave, and in which the MO signals of the bowl-shaped pattern of the track position shift are overlapped, it is possible to obtain a more accurate MO signal because its noise is reduced. Additionally, it is also possible to make such an optical head more compact and lightweight than prior art devices.

Figure 11:
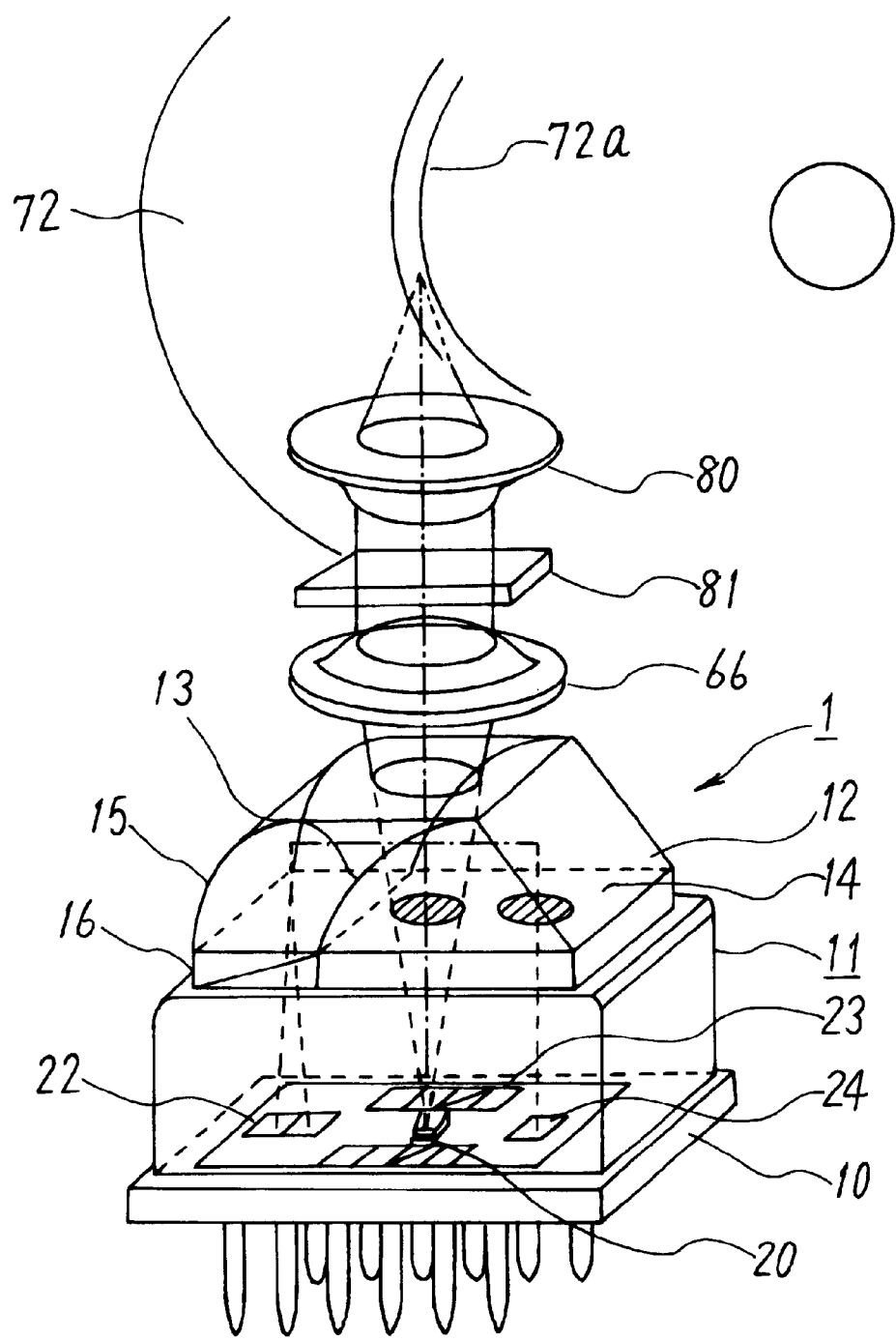
FIG. 11 is a pictorial view of the optical head of a second embodiment of the present invention.

FIG. 11 is a pictorial view of an optical head of a second embodiment of the present invention. Components that are essentially the same as those shown in the embodiment of FIG. 3 are indicated with the same reference numbers.

Figure 14:
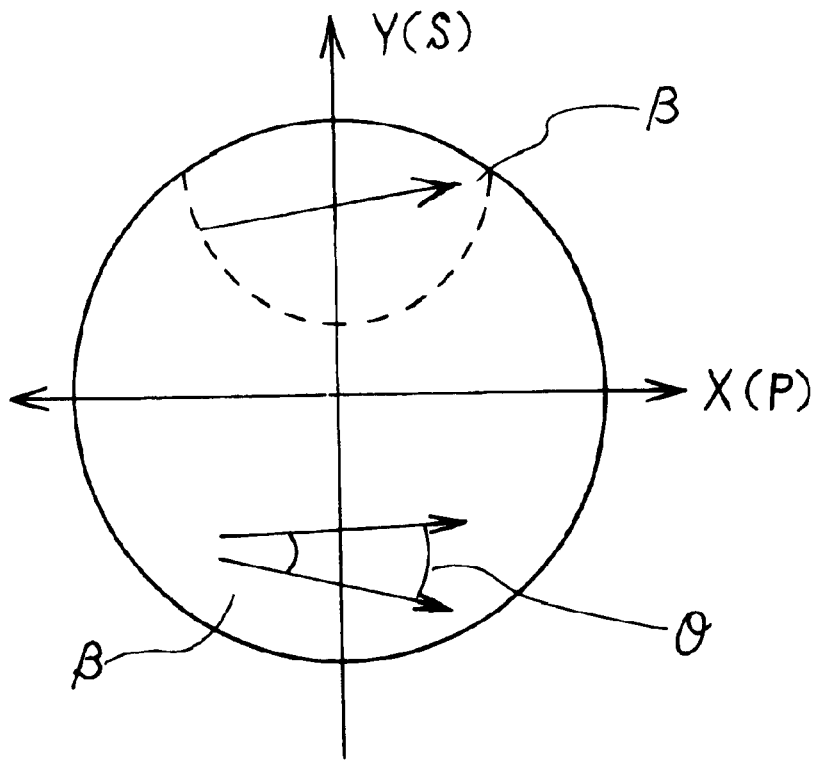
FIG. 14 is a drawing explaining a feature of the prior art.

As shown in FIG. 11, the direction of the linear polarized light of the optical head 1 is set such that it orthogonally crosses the groove 72a of the magneto-optical disk 72. In the prior art device of FIG. 14, which was described above, a problem occurs in that the rotated polarization component overlaps the bowl-shaped image of the TES signal. Such an overlap is not desirable because a compensating electronic circuit is needed to remove the overlap. In this second embodiment of the present invention, by having the direction that crosses the track be orthogonal to the direction of the linear polarized light, then the bowl-shaped image in FIG. 14 is rotated by exactly 90 degrees, and thus it is possible to prevent the rotated polarization component from being overlapped with the bowl-shaped image of the TES signal. Accordingly, the compensating electronic circuit may be omitted from this embodiment.

In this embodiment, it is necessary to add a plate 81 that has a wavelength of ½ λ in order to project the light onto the magneto-optical disk in the proper orientation. Plate 81 is positioned between the objective lens 80 and the collimator lens 66.

Figure 12:
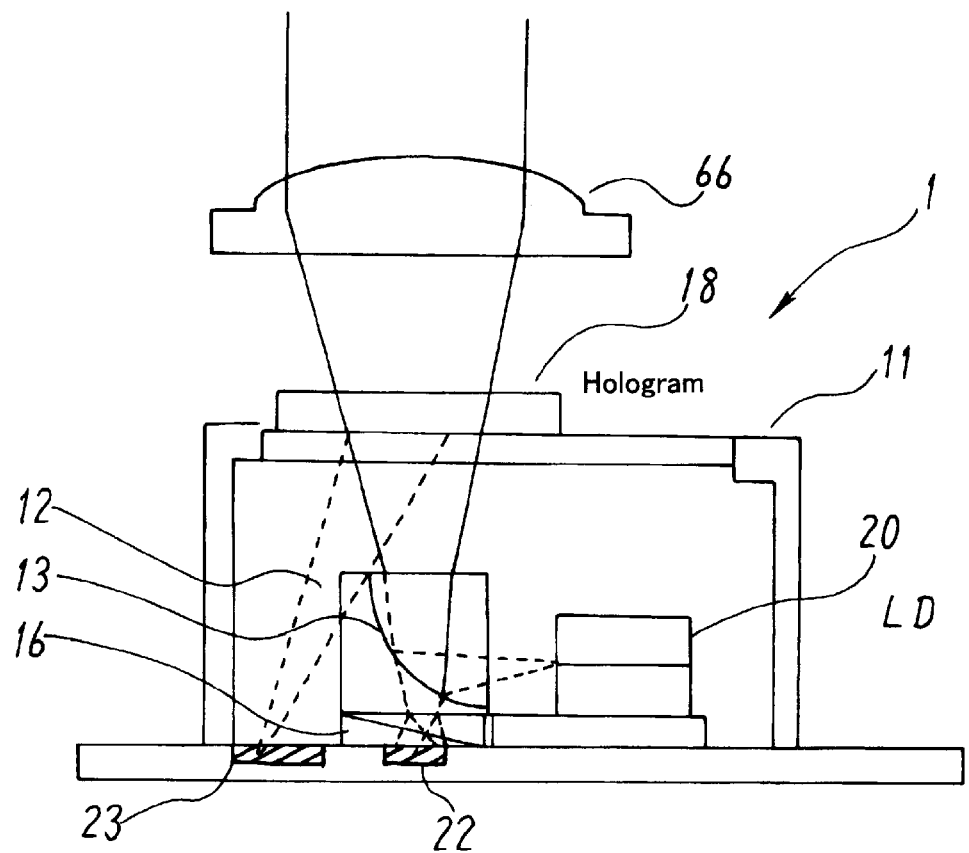
FIG. 12 is a profile view of the optical head of a third embodiment of the present invention.
Figure 13:
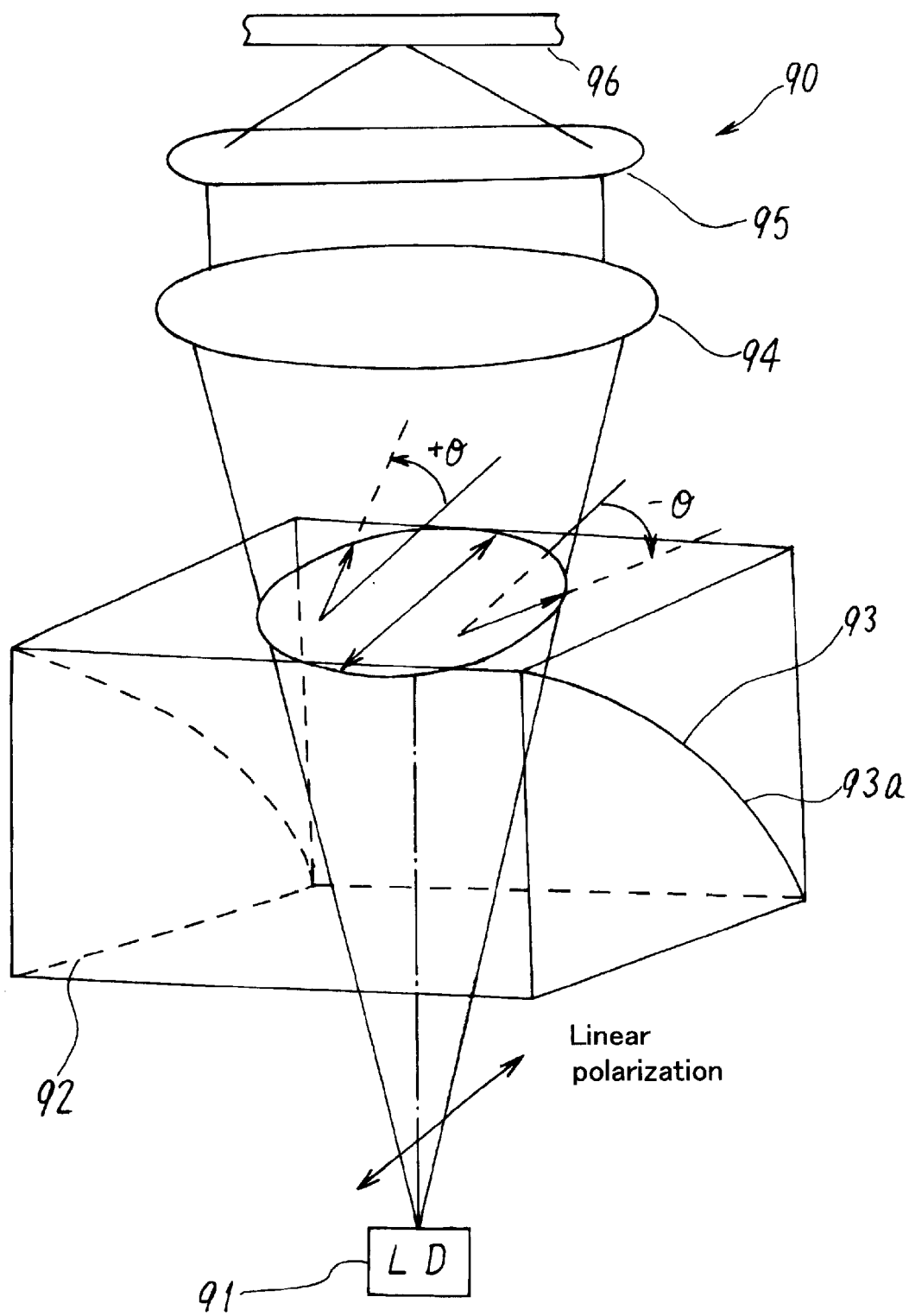
FIG. 13 is a pictorial view of an optical head of the prior art.

FIG. 12 is a profile view of the optical head of a third embodiment of the present invention. Components that are essentially the same as those shown in FIG. 3 are indicated with the same reference numbers.

In this embodiment, the forward path is the path used for the S-polarized light. In other words, the cylindrical optical element 12 is used for reflection. Thus, the function of mirror 21 (of the FIG. 3 embodiment and the FIG. 11 embodiment) is performed by the optical element 12, so it is unnecessary to include mirror 21 in the FIG. 12 embodiment. In this embodiment, as in the embodiments of FIGS. 3 and 11, there is a servo hologram 18 on the top of the case 11. When the magneto-optical signal is on its return path, it passes through the optical element 12, then it is separated into two beams by a Wollaston polarizing prism 16, and finally it is projected onto an MO detector 22. In this embodiment, as in the other embodiments, the TES signal is removed from the MO signal by the correction circuit 53 described above.

Referring back to the FIG. 3 embodiment, when using a transmissible type for the forward path, by reducing the light of the S-polarized light component, which is the reflected component of the signal beam, on the return path, it is possible to reduce rotation of the linear polarized light. Therefore, in order to reduce the rotation angle of the linear polarized light, it is desirable to keep the S-polarized light reflectivity of the cylindrical surface 13 to 80% or less. Of course, in the case of the reflecting type in the FIG. 12 embodiment, it is best to keep the S-polarized light transmission of the signal component to 80% or less.

Furthermore, with regard to the first embodiment of FIG. 3, it is possible to set the gain K described in FIG. 9 to an optimal value. For example, the disk 72 is rotated and the MO signal is monitored, and the gain can be adjusted such that the fluctuation (amplitude) of the MO signal becomes a minimum with respect to tracking shift.

As described above, the present invention has the following effects:

(1) Since the tracking error that is overlapped by the MO signal is synchronous with the tracking signal, it is possible to remove the error from the MO signal by overlapping the tracking error signal with the MO signal.

(2) It is possible to accurately reproduce the MO signal even though a compact head which emits a divergent spherical light on the beam splitter surface of a beam splitter is used. Particularly, it is possible to accurately reproduce an MO signal even when the P-polarized light component and the S-polarized light component are difficult to separate due to increased density.

(3) Moreover, it is possible to detect the MO signal even when the density of the storage medium is high, thus making it possible to use a high-density medium with the present invention.

While various embodiments of the present invention have been shown and described, it should be understood that other modifications, substitutions and alternatives may be apparent to one of ordinary skill in the art. Such modifications, substitutions and alternatives can be made without departing from the spirit and scope of the invention, which should be determined from the appended claims.

Various features of the invention are set forth in the appended claims.

What is claimed is:

1. A magneto-optical apparatus comprising:
    a beam splitter having a beam splitter surface for splitting a path of a light beam during its forward path to and its return path from a magneto-optical storage medium;
    a light source for emitting a divergent spherical wave onto said beam splitter surface in order to radiate a spot of light onto said magneto-optical storage medium;
    an MO detection unit for detecting a magneto-optical signal from light on said return path;
    a track error detection unit for detecting a tracking error signal from light on said return path; and
    a correction unit for overlapping the tracking error signal with the magneto-optical signal to correct said magneto-optical signal.

2. The magneto-optical apparatus of claim 1 wherein said beam splitter surface is curved in one direction.

3. The magneto-optical apparatus of claim 1 wherein said beam splitter surface allows a first portion of said divergent spherical wave to pass through and projects said first portion of said divergent spherical wave on said forward path as P-polarized light.

4. The magneto-optical apparatus of claim 1 wherein said beam splitter surface of said beam splitter reflects said divergent spherical wave and projects said divergent spherical wave on said forward path as S-polarized light.

5. The magneto-optical apparatus of claim 1 wherein said beam splitter surface is shaped as a portion of a cylindrical surface.

6. The magneto-optical apparatus of claim 5 wherein said beam splitter also includes a second reflective surface on an outer periphery thereof.

7. The magneto-optical apparatus of claim 6 wherein said second reflective surface is shaped as a portion of a cylindrical surface.

8. An optical head comprising:
    a beam splitter having a beam splitter surface for splitting a path of a light beam during its forward path to and its return path from a magneto-optical storage medium;
    a light source for emitting a divergent spherical wave onto said beam splitter surface in order to radiate a spot of light onto said magneto-optical storage medium;
    an MO detection unit for detecting a magneto-optical signal from light on said return path; and
    a plate with a wavelength of ½λ located between said magneto-optical storage medium and said beam splitter; and
    where the direction of linear polarized light emitted from said beam splitter toward said magneto-optical storage medium is set such that it is orthogonal to the tracks in said magneto-optical storage medium.

9. A magneto-optical apparatus comprising:
    a beam splitter having a beam splitter surface for splitting a path of a light beam during its forward path to and its return path from a magneto-optical storage medium;
    a light source for emitting a divergent spherical wave onto said beam splitter surface in order to radiate a spot of light onto said magneto-optical storage medium;
    an MO detection unit for detecting a magneto-optical signal from light on said return path; and
    a plate with a wavelength of ½λ located between said magneto-optical storage medium and said beam splitter; and
    where the direction of linear polarized light emitted from said beam splitter toward said magneto-optical storage medium is set such that it is orthogonal to the tracks in said magneto-optical storage medium.

* * * * *